Figure 1:
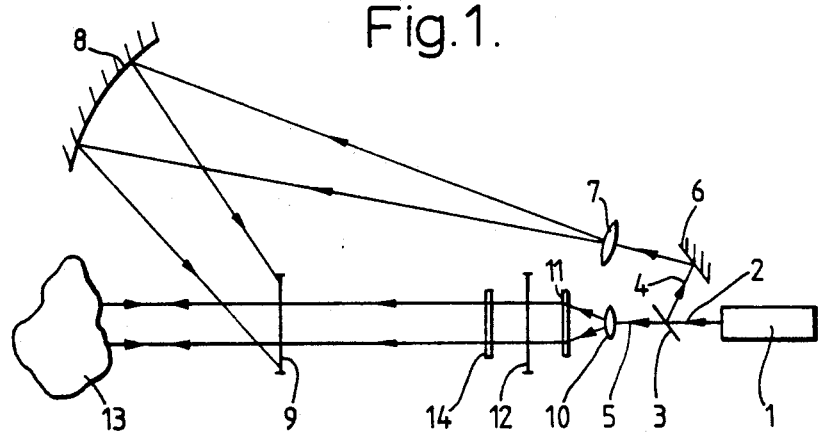

United States Patent [19]

Copp

[11] Patent Number: 4,603,937

[45] Date of Patent: Aug. 5, 1986

[54] HOLOGRAPHY

[76] Inventor: James R. Copp, Braxted Park, Witham, Essex CM8 3XB, England

[21] Appl. No.: 616,949

[22] Filed: Jun. 5, 1984

[30] Foreign Application Priority Data

Jun. 6, 1983 [GB] United Kingdom ............... 8315427

[51] Int. Cl.$^4$ ............................................. G03H 1/12
[52] U.S. Cl. .................................. 350/368; 350/3.85
[58] Field of Search ...................... 350/3.6, 3.66, 3.69, 350/3.77, 3.83, 3.85, 3.86, 3.67, 3.68

[56] References Cited

U.S. PATENT DOCUMENTS 4,420,218 12/1983 Rubanov et al. ............... 350/3.85

Primary Examiner—Bruce Y. Arnold
Attorney, Agent, or Firm—Brooks & Kushman

[57] ABSTRACT

A method of producing a holograph of a large object, for example, a building, in which a photographic transparency of the building is taken and laser light passed through the transparency to irradiate a 3-dimensional scale model of the building, the holograph being produced either by reflection or transmission.

7 Claims, 2 Drawing Figures

U.S. Patent    Aug. 5, 1986    4,603,937

HOLOGRAPHY

This invention relates to improvements in holography.

Two standard techniques for the production of holographs are known. The first standard technique is to irradiate a subject and a laser light-sensitive emulsion with laser light and to record the interference pattern between the reference wave and the wave patterns reflected from the subject in the emulsion for the production of a hologram. This technique is quite successful but its use imposes severe restrictions on the choice of subject particularly with regard to its refectivity, size, stability or the subtle expressions of the subject's form.

A second standard technique is to interrupt the subject or object wave by placing therein a diffusing medium integral to either a real object or its likeness in the form of a continuous tone and/or high contrast partially transmitting graphic or photographic representation and to cause the unobstructed or transmitted portion of the subject wave thus produced to interfere with a reference wave in the production of a hologram. This "shadowgram" is in the first instance a 3-dimensional shadow of the subject and in the second instance an essentially 2-dimensional representation of the subject. In neither instance is the reconstructed hologram definitive of the original subject's 3-dimensional form.

OBJECT OF THE INVENTION

It is the main object of this invention to provide a method for the production of holographs which is neither dependent upon the presence of the actual subject during the recording of the hologram nor limited by the representational inadequacies of the shadowgram technique.

STATEMENTS OF INVENTION

According to the present invention there is provided a method of producing holographs of a subject on laser lightsensitive emulsion which includes irradiating the laser light-sensitive emulsion and a scale representation of a subject with laser light and wherein the energy distribution across the laser light incident upon the scale representation varies in accordance with a partially transmitting optical element or elements depicting the subject from the same apparent viewpoint as the laser light irradiates the scale representation.

DRAWINGS

Figure 2:
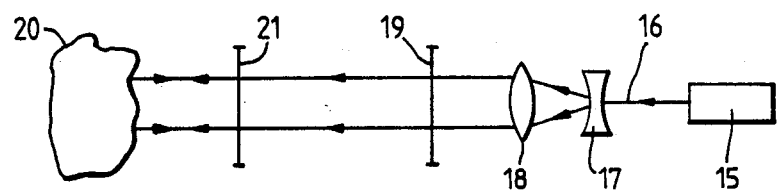

FIG. 1 is an optical diagram of a typical layout for carrying out the method of the invention; and FIG. 2 is an alternative optical layout in accordance with the invention.

SPECIFIC EMBODIMENTS

Although the invention is not so limited it finds particular application in producing holographs of very large objects, for example, buildings. The invention requires the production of two representations of the subject, namely, a 3-dimensional scale model fashioned in a stable material, for example, metal or plaster, and a transparency which may be produced in many ways, for example, photographically, by the use of holography or even by hand.

It is essential, in performing the method of the invention, that the transparency should depict the subject from an apparent viewpoint identical with the viewpoint that the scale representation or model of the subject is irradiated by the laser light in the production of the holograph. It can thus be said that the scale representation of the subject enables the holograph to produce the 3-dimensional effect but with the limitation of lack of fine detail whereas the transparency superimposes the fine detail within the holograph.

In a typical layout shown in FIG. 1, there is provided a source of coherent laser light producing a beam 2. This beam 2 is split into an appropriate ratio by a partially reflecting and transmitting element 3 into a reference beam 4 and an object beam 5. The reference beam 4 is directed via mirror 6, lens 7 and collimating mirror 8 onto a plate 9 containing laser lightsensitive emulsion. The object beam passes through lens 10 and collimator 11 which directs the beam as collimated light through photographic transparency 12 and thence to plate 9 and onto subject 13 from which it is reflected to form an interference pattern with the reference beam 4. If desired, although this is not essential, a focusing lens system 14 may be provided. The 2-dimensional transparency 12 depicts the subject 13 from the same viewpoint as the subject 13 is irradiated by the laser light.

The interference pattern between reference beam 4 and object beam 5 is recorded on the emulsion carried by plate 9 and subsequently processed for its reconstruction in known manner.

An alternative layout is illustrated in FIG. 2 in which a source 15 of coherent laser light produces a beam 16 which passes through a lens 17 and a collimator 18. The beam then passes through transparency 19 as the subject 20 is irradiated by the beam 16. The transparency 19 is produced in one or more different ways, as previously mentioned, and depicts the subject 20 from the same apparent viewpoint as the subject 20 is irradiated by the beam 16. An interference pattern is recorded in the emulsion of plate 21 and the emulsion processed in the normal manner.

It will be appreciated by persons skilled in the art that the technique of producing holographs according to this invention is equally applicable to transmission and reflection holography.

If desired, a pulse laser source may be used so that the scale model of the subject need not be completely stabilised.

I claim:

1. A method of producing holographs of a subject on a laser light-sensitive emulsion which includes irradiating the laser light-sensitive emulsion with a reference beam of laser light, and with an object beam of laser light reflected from a scale representation of a subject, wherein the energy distribution across the laser light incident upon the scale representation varies in accordance with a partially transmitting optical element or elements depicting the subject from the same apparent viewpoint as the object beam irradiates the scale representation.

2. The method as claimed in claim 1, in which the partially transmitting optical element is a photographic transparency.

3. The method as claimed in either claim 1 or claim 2, in which the laser light is derived from a pulse laser.

4. A method of producing holographs of a subject on a laser light-sensitive emulsion which includes irradiating the laser light-sensitive emulsion with a reference beam of laser light and with an object beam of laser light, wherein the object beam of laser light passes through a partially transmitting optical element having a two-dimensional depiction of the subject, and the object beam is reflected from a scale representation of the subject onto the laser light-sensitive emulsion, the two-dimensional depiction of the subject being from the same apparent viewpoint as that of the object beam irradiating the scale representation.

5. In a method of producing holographs of a subject on a laser light-sensitive emulsion which includes irradiating the laser light-sensitive emulsion with a reference beam of laser light and with an object beam of laser light reflected from the subject, the improvement comprising:

placing one or more partially transmitting optical elements in the path of the object beam between the laser light source and the irradiated subject, wherein the optical elements depict the subject from the same apparent viewpoint as that of the object beam irradiating the subject, thereby providing finer details to the image of the subject recorded on the light-sensitive emulsion.

6. A holograph produced by a method which includes irradiating a laser light-sensitive emulsion with a reference beam of laser light and with an object beam of laser light, wherein the object beam of laser light passes through a partially transmitting optical element having a two-dimensional depiction of the subject, and wherein the object beam is reflected from a scale representation of the subject onto the laser light-sensitive emulsion, the two-dimensional depiction of the subject being from the same apparent viewpoint as the object beam irradiating the scale representation to provide a holograph having a three-dimensional subject including details of certain of the subject's features in two dimensions.

7. A holograph of a three-dimensional subject consisting of a single emulsion having details of the subject recorded on the emulsion from a two-dimensional depiction of the subject.

* * * * *